United States Patent
Moxon

(10) Patent No.: US 10,737,759 B2
(45) Date of Patent: *Aug. 11, 2020

(54) AIRCRAFT ELECTRICAL NETWORK

(71) Applicant: ROLLS-ROYCE plc, London (GB)

(72) Inventor: Matthew Moxon, Derby (GB)

(73) Assignee: ROLLS-ROYCE plc, London (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/658,432

(22) Filed: Oct. 21, 2019

(65) Prior Publication Data
US 2020/0047871 A1 Feb. 13, 2020

Related U.S. Application Data

(63) Continuation of application No. 15/483,721, filed on Apr. 10, 2017, now Pat. No. 10,518,863.

(30) Foreign Application Priority Data

Apr. 22, 2016 (GB) .................. 1607038.5

(51) Int. Cl.
  *B64C 3/00* (2006.01)
  *B64D 27/12* (2006.01)
  (Continued)

(52) U.S. Cl.
  CPC .................. *B64C 3/00* (2013.01); *B64C 3/18* (2013.01); *B64C 3/34* (2013.01); *B64D 27/12* (2013.01); *B64D 27/24* (2013.01); *B64D 2027/026* (2013.01); *B64D 2221/00* (2013.01); *Y02T 50/62* (2013.01)

(58) Field of Classification Search
  CPC .... B64C 3/00; B64C 3/18; B64C 3/34; B64D 2027/026; B64D 2221/00; B64D 27/12; B64D 27/24; Y02T 50/62
  See application file for complete search history.

(56) References Cited

U.S. PATENT DOCUMENTS 4,605,185 A * 8/1986 Reyes .................. B64D 27/24
                                                    244/55
5,122,072 A * 6/1992 Arn ...................... H01R 4/5008
                                                   439/210
(Continued)

FOREIGN PATENT DOCUMENTS

| EP | 2 878 538 A1 | 6/2015 |
|----|-------------|--------|
| EP | 2910739 A1  | 8/2015 |
| GB | 213065 A    | 3/1924 |

OTHER PUBLICATIONS

Oct. 13, 2016 Brititsh Search Report issued in European Patent Application No. 1607038.5.
(Continued)

*Primary Examiner* — Medhat Badawi
(74) *Attorney, Agent, or Firm* — Oliff PLC

(57) ABSTRACT

An aircraft has an internal combustion engine and a wing including a hollow structural member. The aircraft has an electrical network including: an electrical motor configured to drive an aircraft propulsor; at least one conductor configured to electrically couple the electrical motor and an electrical storage device; wherein the electrical conductor is formed of the hollow structural member of the aircraft wing.

5 Claims, 2 Drawing Sheets

(51) Int. Cl.
    *B64C 3/34*          (2006.01)
    *B64C 3/18*          (2006.01)
    *B64D 27/24*        (2006.01)
    *B64D 27/02*        (2006.01)

(56) References Cited

U.S. PATENT DOCUMENTS

| | | | | |
|---|---|---|---|---|
| 7,207,521 B2* | 4/2007 | Atkey | B64D 13/06 | 244/58 |
| 9,096,312 B2 | 8/2015 | Moxon | | |
| 9,475,579 B2 | 10/2016 | Fredericks et al. | | |
| 9,729,096 B2 | 8/2017 | Edwards | | |
| 9,742,225 B2* | 8/2017 | Klassen | H02K 21/22 | |
| 9,950,801 B2* | 4/2018 | Viala | B64D 27/24 | |
| 10,071,801 B2* | 9/2018 | North | B64C 25/52 | |
| 10,131,441 B2* | 11/2018 | Edwards | B64D 27/02 | |
| 10,252,797 B2* | 4/2019 | Vondrell | B64C 3/32 | |
| 10,273,019 B2* | 4/2019 | Sands | B64D 27/24 | |
| 2003/0180145 A1* | 9/2003 | Goldberg | F01D 7/00 | 416/1 |
| 2004/0118969 A1* | 6/2004 | MacCready | B64C 1/26 | 244/5 |
| 2005/0236175 A1* | 10/2005 | Reis | H01B 12/06 | 174/125.1 |
| 2006/0254255 A1* | 11/2006 | Okai | B64D 27/24 | 60/226.1 |
| 2007/0139019 A1* | 6/2007 | Wiegman | H02J 3/46 | 322/19 |
| 2008/0184906 A1* | 8/2008 | Kejha | B64C 39/024 | 102/374 |
| 2008/0303280 A1* | 12/2008 | Xu | H02P 9/302 | 290/31 |
| 2009/0127855 A1* | 5/2009 | Shander | H02J 4/00 | 290/7 |
| 2010/0193630 A1* | 8/2010 | Duces | H02J 3/02 | 244/58 |
| 2011/0024567 A1* | 2/2011 | Blackwelder | B64D 15/12 | 244/134 D |
| 2011/0198918 A1* | 8/2011 | Langlois | B64D 41/00 | 307/9.1 |
| 2012/0063934 A1* | 3/2012 | Rumbaugh | F04D 29/026 | 417/410.1 |
| 2013/0119664 A1* | 5/2013 | Pereira | B64D 41/00 | 290/46 |
| 2014/0138479 A1* | 5/2014 | Vieillard | B64C 25/405 | 244/50 |
| 2014/0333127 A1* | 11/2014 | Edwards | B60R 16/03 | 307/9.1 |
| 2015/0013306 A1* | 1/2015 | Shelley | F02K 5/00 | 60/224 |
| 2015/0042155 A1* | 2/2015 | Vieillard | H02J 9/061 | 307/9.1 |
| 2015/0144742 A1* | 5/2015 | Moxon | B64C 11/00 | 244/215 |
| 2015/0244296 A1* | 8/2015 | Edwards | F02C 9/00 | 290/40 B |
| 2015/0344138 A1* | 12/2015 | Wen | H05B 3/286 | 219/541 |
| 2016/0244158 A1* | 8/2016 | Fredericks | B64C 25/52 | |
| 2016/0332741 A1* | 11/2016 | Moxon | B64C 15/00 | |
| 2017/0302145 A1* | 10/2017 | Holenstein | H02K 19/103 | |
| 2017/0305524 A1* | 10/2017 | Moxon | B64C 3/18 | |

OTHER PUBLICATIONS

Aug. 29, 2017 Extended European Search Report issued in European Patent Application No. 17165704.

* cited by examiner

AIRCRAFT ELECTRICAL NETWORK

This application is a continuation application of U.S. patent application Ser. No. 15/483,721, filed on Apr. 10, 2017, which claims priority to GB 1607038.5, filed on Apr. 22, 2016. The disclosures of each are herein incorporated by reference in their entireties.

FIELD OF THE INVENTION

The present invention relates to an aircraft electrical network, particularly, though not exclusively, to an aircraft electrical network for an aircraft comprising electrically driven propulsors.

BACKGROUND TO THE INVENTION

In view of increasing energy costs, there is a continuing need to provide aircraft which burn less fuel for a given set of requirements. In co-pending UK patent application GB 1320988.7 (incorporated herein by reference) an aircraft is proposed in which a plurality of electrically driven propulsors is provided. The electrically driven propulsors are provided with electrical power from one or more internal combustion engines in the form of gas turbine engines, which drive AC generators. This arrangement is thought to result in a highly efficient aircraft in view of reduced wing sizing for a given mission, as well as other effects.

However, in order for the aircraft to remain competitive compared to a conventional aircraft, it is necessary for the electrical generators and associated electrical transmission arrangement to be as light as possible, while generating and transmitting electrical power with as few losses as possible.

The present invention describes an aircraft electrical transmission network which seeks to overcome some or all of the above problems.

SUMMARY OF THE INVENTION

According to a first aspect of the present invention, there is provided an aircraft comprising an internal combustion engine and a wing comprising a hollow structural member, wherein the aircraft comprises an electrical network comprising:

at least one alternating current electrical generator configured to be driven by the internal combustion engine;

an electrical motor configured to drive an aircraft propulsor;

at least one conductor configured to electrically couple the electrical motor and the electrical generator;

wherein the electrical conductor is formed of the hollow structural member of the aircraft wing.

Accordingly, electrical power can be transmitted by a hollow structural member. In view of the relatively high frequency and high power of the electrical power transmitted between the generator and the electrical motors, it is desirable for the conductor to be hollow, in view of the relatively small skin depth of the current in such circumstances.

By using a hollow structural member as the conductor, a low resistance conductor can be provided, without significantly increasing the weight of the aircraft structure, since the conductor provides part of the structural integrity of the aircraft.

The conductor may comprise a conductive coating provided on a surface of the hollow structural member. Alternatively or in addition, the hollow structural member may comprise a conductive material such as aluminium, and may provide a conductive path of the conductor.

The hollow structural member may comprise any of a wing leading edge box, a wing centre box, and a wing trailing edge box. Preferably, the hollow structural member comprises a wing leading edge D-box.

The conductor may comprise at least two conducting elements carrying a separate electrical phase. For example, the conductor may comprise a current carrying element and a current return/ground element. Each current carrying/current return element may be arranged concentrically.

The conductor may comprise one or more insulators configured to insulate the conductor from surrounding structure, and/or insulate the current carrying element from the current return/ground element.

The alternating current electrical generator may be configured to provide electrical current having a frequency between 360 and 2000 Hz.

DETAILED DESCRIPTION

Figure 1:
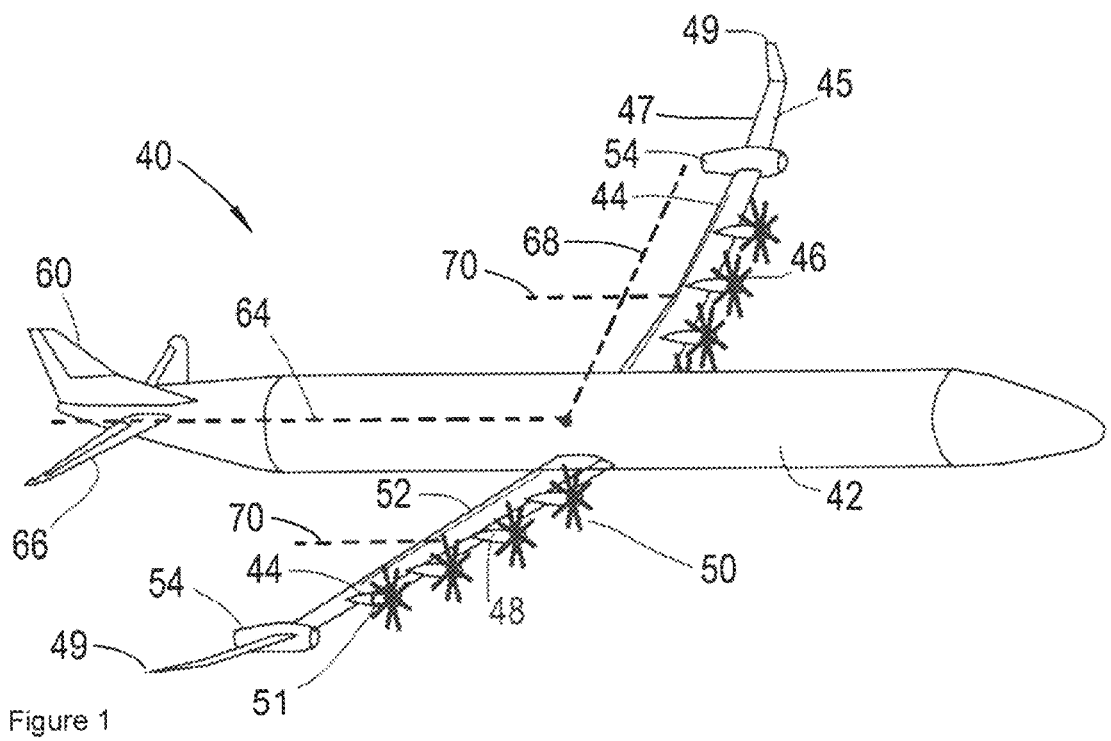
FIG. 1 shows a perspective view of an aircraft in accordance with the present disclosure comprising an electrical network in accordance with the present disclosure.

FIGS. 1 to 5 show an aircraft 40 in accordance with the present disclosure. The aircraft 40 comprises a fuselage 42, a pair of wings 44 extending therefrom generally normal to the fuselage 42 along an axis 68, and an empennage located at an aft end of the fuselage 42 which defines a longitudinal axis 64. The empennage comprises vertical and horizontal tailplanes 60, 66.

A wingspan is defined by the distance between wing tips 49. Each wing 44 comprises a leading edge 45 and a trailing edge 47, which together define a chord extending therebetween. The ratio between the wingspan and chord length defines an aspect ratio. As can be seen from FIG. 2, the chord length varies along the wing span, from a relatively large chord at the wing root adjacent the fuselage 42, to a relatively small length at the wing tips 49. In cases such as this where the chord varies along the span, the aspect ratio AR can be defined as the square of the wingspan b divided by the area S of the wing planform:

$$AR = \frac{b^2}{S}$$

Figure 2:
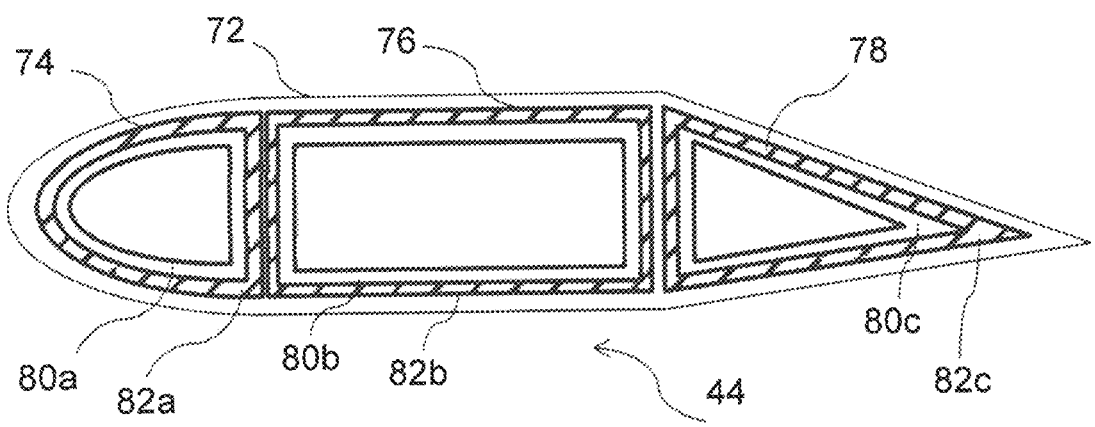
FIG. 2 shows a cross sectional view through an aerofoil of an aircraft in accordance with the present disclosure.

In the example shown in FIG. 2, the aspect ratio is approximately 25, though higher aspect ratios such as aspect ratios up to 30 or more may be achieved. In other cases, lower aspect ratios may be desirable, such as where the aircraft comprises a short takeoff and landing aircraft (STOL). Each wing 44 preferably further comprises a deployable high lift device in the form of flaps 52 located at the trailing edge 47 of each wing 44. Optionally, the deployable high lift device may include one or more slats (not shown) located at the leading edge 45 of the wing. The flaps 52 are selectable between a stowed position (as shown in FIG. 2) and a deployed position, in which the flaps 52 increase the lift coefficient of the wing 44 compared to when the flaps 52 are in the stowed position. The deployable high lift devices may be deployable to intermediate positions between the deployed and stowed positions.

A plurality of propulsors 46 is provided on each wing 44, which provide thrust to drive the aircraft forward. The plurality of propulsors 46 on each wing together define a centre of thrust 70, i.e. a notional line extending rearwardly from the centre of the airflow provided by the propulsors 46 on that wing 44. In the described embodiment, four propulsors are provided, though more or fewer propulsors may in some cases be provided. The relatively large number of propulsors 46 enables a relatively large propulsor disc area to be employed. Consequently, the propulsors are highly efficient and relatively quiet, without requiring excessive ground clearance, which thereby reduces the length of the undercarriage.

Each propulsor 46 comprises an electric motor 51 housed within a nacelle 48, and a propeller 50 driven by the motor 51, though other forms of propulsors such as electrically driven ducted fans driven by the motors 51 could be employed. Each propeller 50 is located forward of the leading edge 45 of the wing 44, and is mounted to the wing 44 by the nacelle 48. In use, the propellers 50 rotate to provide airflow, and therefore thrust. As the propellers 50 are located forward of the leading edge 45, the airflow travels over the portion of the wing 44 located behind the respective propellers 50, and in particular over the flaps 52. This airflow increases the effective airflow over the wing 44, thereby increasing the coefficient of lift (CL) when the propellers 50 are turning, and particularly where the flaps 52 are extended. The propellers 50 are relatively closely spaced, such that the propellers 50 provide airflow over a large proportion of the wing 44, and particularly, the portion of the wing on which the flaps 52 are located.

In the described embodiment, the maximum coefficient of lift of each wing 44 when the flaps 52 are deployed, and the propulsors 46 are at maximum power ($C_{Lmax(power\ on)}$) is approximately twice the maximum coefficient of lift of each wing 44 when the propulsors 46 are at minimum power ($C_{Lmax(power\ off)}$), i.e. when the propulsors 46 are turned off. Consequently, the propulsors 46 substantially increase the amount of lift generated by the wings 44, thereby reducing the wing area required for a given amount of lift, or increasing the amount of lift for a given wing area.

Figure 4:
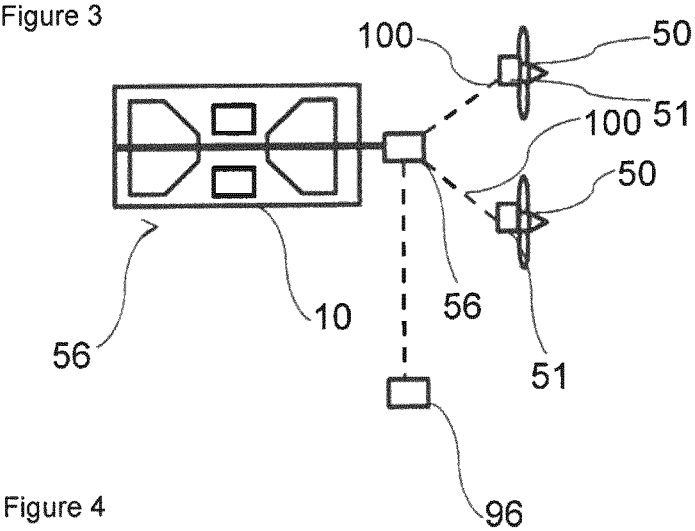
FIG. 4 shows a schematic electrical diagram of a propulsion system of the aircraft of FIG. 1.

Each wing further 44 comprises a generator arrangement 54, shown in further detail in FIG. 4. The generator arrangement 54 comprises an internal combustion engine in the form of a gas turbine engine 10 and an alternating current (AC) electrical power generator 56 driven by the engine 10. In the described embodiment, a single generator arrangement is provided on each wing 44, though further generator arrangements could be provided. The engine 10 drives the electrical power generator 56 to provide electrical power. An electrical energy storage device such as a capacitor, chemical battery or hydrogen fuel cell 96 is included, which can be charged by the generator 56 to provide power to the propulsors 50 for a short period on engine failure or to improve performance for short duration flight segments such as e.g. takeoff or climb. Power is distributed to the electrical motors 51 which drive the propulsors 50 via a plurality of conductors 100.

In order to generate electricity efficiently from the relatively high speed shafts of the engine, without recourse to relatively heavy and bulky reduction gearboxes, it is necessary to provide an electrical generator 56 which produces electrical power at a relatively high AC frequency, such as 360 to 2000 Hz, which corresponds to the frequency generated by a three-phase generator driven directly by the low pressure shaft of a typical two shaft or three shaft gas turbine engine. In such cases, it can be shown that the skin depth of conductors carrying such high frequency electrical power is relatively small—of the order of a few millimetres, as shown below.

The skin depth $\delta$ is related to the angular frequency of the AC current $\omega$ (i.e. $2\pi \times$ the frequency), resistivity of the conductor $\rho$, relative magnetic permeability of the conductor $\mu_r$, and the permeability of free space $\mu_0$ in accordance with the following equation:

$$\delta = \sqrt{\frac{2\rho}{\omega \mu_r \mu_0}}$$

The resistivity of aluminium 2024 alloy typically used in aircraft construction varies between 3 and $4 \times 10^{-8}$ $\Omega$m, the relative magnetic permeability is approximately 1, the permeability of free space is $4\pi \times 10^{-7}$ Hm$^{-1}$, and the maximum angular frequency of the current in this example is approximately 5000 ($800 \times 2\pi$). Consequently, the skin depth in this example would be approximately 3 mm. Consequently, a solid cable carrying this current would either have a relatively high resistance in view of the relatively small effective cross sectional area of the conductor, or a relatively large diameter, and so a relatively high weight, much of which would not carry a significant portion of the current.

FIG. 2 shows a cross sectional view through part of the wing 44. As can be seen, the wing comprises an outer skin 72, which provides an outer aerodynamic surface over which air flows in flight. Enclosed within the skin 72 is a load bearing structural arrangement comprising a plurality of hollow tubular structural members in the form of a leading edge (also known as a D-box), centre and trailing edge wing boxes 74, 76, 78. Further load bearing hollow tubular structures may be provided, such as ribs (which generally run in a chordwise direction, i.e. between the leading and trailing edges of the wing 44), and longerons (which generally attach the skin 72 to the ribs, and run in a spanwise direction, i.e. in a direction running between the root and the tip of the wing 44).

Each of the hollow members 74, 76, 78 is hollow, and made from an electrically conductive structural metal alloy such as aluminium. Consequently, one or more of the hollow structural members can be used as a conductor. The members 74, 76, 78 may have any of a tubular, triangular, D-shaped, or box section cross section, or any other cross section as would be appropriate in view of the local shape of the surrounding skin, and structural considerations.

As can be seen in FIG. 2, each hollow member 74, 76, 78 is divided into two electrical elements, each carrying a separate phase of the AC electrical power. In this example, the D-box section 74 comprises a first current carrying element 80*a* (shown as the shaded portion in FIG. 2) and a ground/current return path element 82*a* (shown as the white portion in FIG. 2) are provided, with one being provided concentrically within the other. Similarly, the hollow members 76, 68 comprise second and third current carrying elements 80*a*, 80*b* respectively, and second and third ground elements 82, 82c respectively. The conductive elements 80a-c, 82a-c are separated by an insulating material, such as Nomex™, to prevent short circuiting. A further layer of insulating material is provided between the outer element 82a-c and the skin 72, again, to prevent short circuits. Consequently, the hollow member 74 is capable of carrying a complete circuit of a two-phase network. The hollow elements 74, 76, 78 together carry a three-phases electrical network, with redundant current return paths. Alternatively, each hollow member 74, 76, 78 could be divided into three elements, with insulation being provided between each element, in which case each hollow member 74, 76, 78 could be used to carry three phase electrical power. In a still further alternative, each hollow member 74, 76, 78 could be formed of a single conductive element, with two or more hollow members 74, 76, 78 being separated by an electrical insulator, and each carrying a separate electrical phase.

Figure 3:
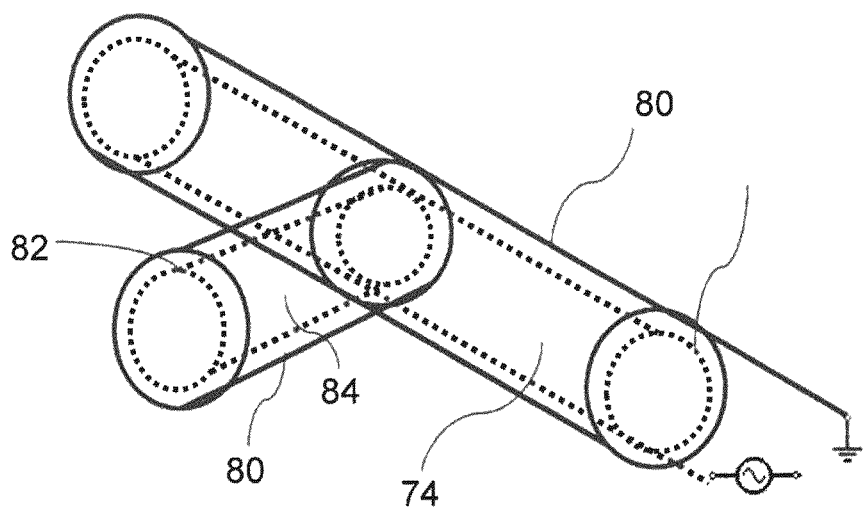
FIG. 3 shows a perspective cross sectional view through the aerofoil of FIG. 2.

FIG. 3 shows a perspective view of the D-box 74, illustrating the electrical connections between the generator 56 and drive motors 51. The D-box 74 includes a projection 84 which extends from the leading edge of the D-box in a forward, chordal direction (i.e. from the leading edge of the wing). The projection 84 leads to the electrical motor 51, and thereby connects the generator 56 to one of the motors 514. As can be seen, due to the concentric arrangement of the elements 80, 82, the electrical circuit can be provided without any overlapping of the elements 80, 82, thereby simplifying construction.

Figure 5:
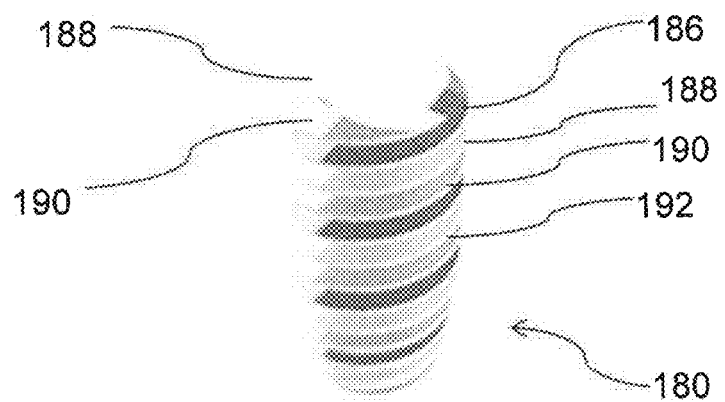
FIG. 5 shows a perspective cross sectional view through part of an alternative current carrying element.

FIG. 5 shows an alternative embodiment, showing an alternative current carrying element 180. In this embodiment, each current carrying element 180 comprises a plurality of electrically conductive filaments 186, 188, 190, which are spirally wound to define a multi-start helix. The spirally wound filaments are be embedded within a matrix such as an epoxy 192, such that the current carrying element 180 comprises a composite material having a high strength to weight ratio and flexibility. As in the previous embodiment, the current carrying element is tubular, defining a hollow space therein, in which further current carrying elements can be contained.

Consequently, each electrical element 180 may comprise a plurality of sub-elements in the form of filaments 186, 188, 190. One of more of these sub-elements may be electrically connected to another sub-element, or may be electrically independent of one or more other sub-element. For example, each of the filaments 186, 188, 190 may carry the same phase between the generator 56 and motor 51, thereby providing redundancy in the event of failure of one or more of the other filaments 186, 188, 190 within that element 180. Connectors (not shown) to each filament 186, 188, 190 could be provided extending radially from the filaments, or at each end. The connectors may comprise current interruption devices such as circuit breakers, which would interrupt current flow in the event of an electrical malfunction.

Alternatively, each of the filaments 186, 188, 190 could carry a separate electrical phase. In such a case, only a single tubular electrical element might be provided.

The arrangement of the present invention provides a synergy, in that the hollow structural members provide both a load carrying, and an electrical power carrying function. Meanwhile, the hollow structural members provide an efficient means of bearing the bending and compressive loads experienced by the aircraft, and an efficient means of transmitting electrical power (in terms of weight and electrical resistance) in view of their hollow, tubular arrangement. In contrast, solid electrical cables would provide relatively low efficiency electrical power transmission (in view of having a small diameter and therefore high resistance, or a large diameter and therefore high weight), while also being poor load bearing elements for all but tensile loads, whereas aircraft load bearing elements typically require transmission of bending loads.

Furthermore, due to the layered construction of the tubular structural elements from different materials, the structure is essentially of a composite nature. Consequently, the insulating material such as Nomex™ may provide compressive strength, while the layers of conductive metallic material may provide tensile and bending strength. Consequently, the hollow structural members may provide improved structural properties compared to prior structural members.

Where the electrically conducting hollow structural elements are provided adjacent the leading edge of the wing (such as in the D-box), resistive heating caused by the elements may help reduce wing icing at the leading edge. Current may be maintained within these conductors during times of non-operation of the motors by windmilling one or more propulsors, such that the propulsor motors act as generators. Similarly, increased current could be provided for de-icing by short-circuiting one or more electrical conductors.

The electrically conducting hollow structural elements may also be used to transmit control signals and other data, for example using frequency or pulse modulation of the electrical current.

The network could comprise an impedance sensor configured to measure electrical impedance between two or more electrical conductors. Advantageously, physical separation/delamination between layers could be detected by measuring conductor electrical impedance, due to the resulting increase in dielectric constant between phases where the gap between conductors is increased.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

Though particular examples of generators and propulsors are provided, it will be understood that these are only examples of a broader class of suitable equipment. For example, other types of electrical generators and motors could be used, such as induction generators and motors. Other forms of propulsors could be used, such as ducted fans.

In addition to motors for powering electrical motors, the electrical conductors could be utilised to power other aircraft equipment, such as actuators, sensors, aircraft environmental control equipment, etc. Similarly, the conductors could carry electrical signals from sensors distributed about the aircraft.

The structural conductor could comprise further conductive layers which are not connected to electrical equipment, in order to provide electrical field shield and/or lightning protection.

In general, it will be appreciated that the invention is applicable to different aircraft configurations. For example, the propulsors could be provided in different locations, such as at the trailing edge of the wing or the aft end of the fuselage. Similarly, the invention is applicable to so-called "blended wing body" aircraft, which do not possess distinct fuselage and wings.

Aspects of any of the embodiments of the invention could be combined with aspects of other embodiments, where appropriate.

The invention claimed is:

1. An aircraft comprising a wing comprising a hollow structural member, the hollow structural member comprising a wing leading edge box, wherein the aircraft comprises an electrical network comprising:
   an electrical motor configured to drive an aircraft propulsor; and
   at least one conductor configured to electrically couple the electrical motor and an electrical energy storage device, the conductor comprising at least two conducting elements carrying a separate electrical phase, each of the at least two conducting elements arranged concentrically,
   wherein the at least one conductor is formed of the hollow structural member of the aircraft wing, and
   wherein the hollow structural member includes a projection extending from a leading edge of the hollow structural member in a direction from a leading edge of the wing, the projection connecting the electrical motor to the electrical energy storage device, the at least two conducting elements are concentrically disposed within the projection.

2. The aircraft according to claim 1, wherein the at least one conductor comprises a conductive coating provided on a surface of the hollow structural member.

3. The aircraft according to claim 1, wherein the hollow structural member comprises a conductive material and provides a conductive path of the at least one conductor.

4. The aircraft according to claim 1, wherein the at least one conductor comprises one or more insulators configured to perform at least one of insulating the at least one conductor from surrounding structure, and insulating the at least two conducting elements from a current return/ground element.

5. The aircraft according to claim 1, wherein the electrical energy storage device is configured to provide electrical current having a frequency between 360 and 2000 Hz.

* * * * *